United States Patent [19]

Tibbals, Jr.

[11] 4,391,156
[45] Jul. 5, 1983

[54] ELECTRIC MOTOR DRIVE WITH INFINITELY VARIABLE SPEED TRANSMISSION

[75] Inventor: Edward C. Tibbals, Jr., Greensboro, N.C.

[73] Assignee: William R. Loeffler, Denver, Colo.

[21] Appl. No.: 207,190

[22] Filed: Nov. 10, 1980

[51] Int. Cl.³ .............................................. F16H 5/44
[52] U.S. Cl. ................................ 74/336.5; 74/752 B; 74/198
[58] Field of Search ................ 74/752 E, 198, 752 B, 74/752 C, 336.5; 318/12

[56] References Cited

U.S. PATENT DOCUMENTS

| | | | |
|---|---|---|---|
| 2,727,396 | 12/1955 | Haugwitz | 74/198 |
| 3,027,777 | 4/1962 | Claudon | 74/336.5 |
| 3,071,018 | 1/1963 | Floyd | 74/198 |
| 3,237,468 | 1/1966 | Schottler | 74/198 |
| 3,248,960 | 5/1966 | Schottler | 74/200 |
| 3,476,201 | 11/1969 | Swaine | 180/65 |
| 3,497,026 | 2/1970 | Calvert | 180/65 |
| 3,745,844 | 7/1973 | Schottler | 74/198 |
| 3,858,674 | 1/1975 | Tabor | 180/65 R |
| 4,065,702 | 12/1977 | Locker et al. | 318/161 |

Primary Examiner—George H. Krizmanich
Attorney, Agent, or Firm—John E. Reilly

[57] ABSTRACT

A drive system adapted for use in motor vehicles comprises an infinitely variable speed drive transmission coupled to a DC motor, and the speed ratio of the transmission is controlled by a speed-responsive flyweight or governor so as to maintain the DC motor at its most efficient operating level.

18 Claims, 3 Drawing Figures

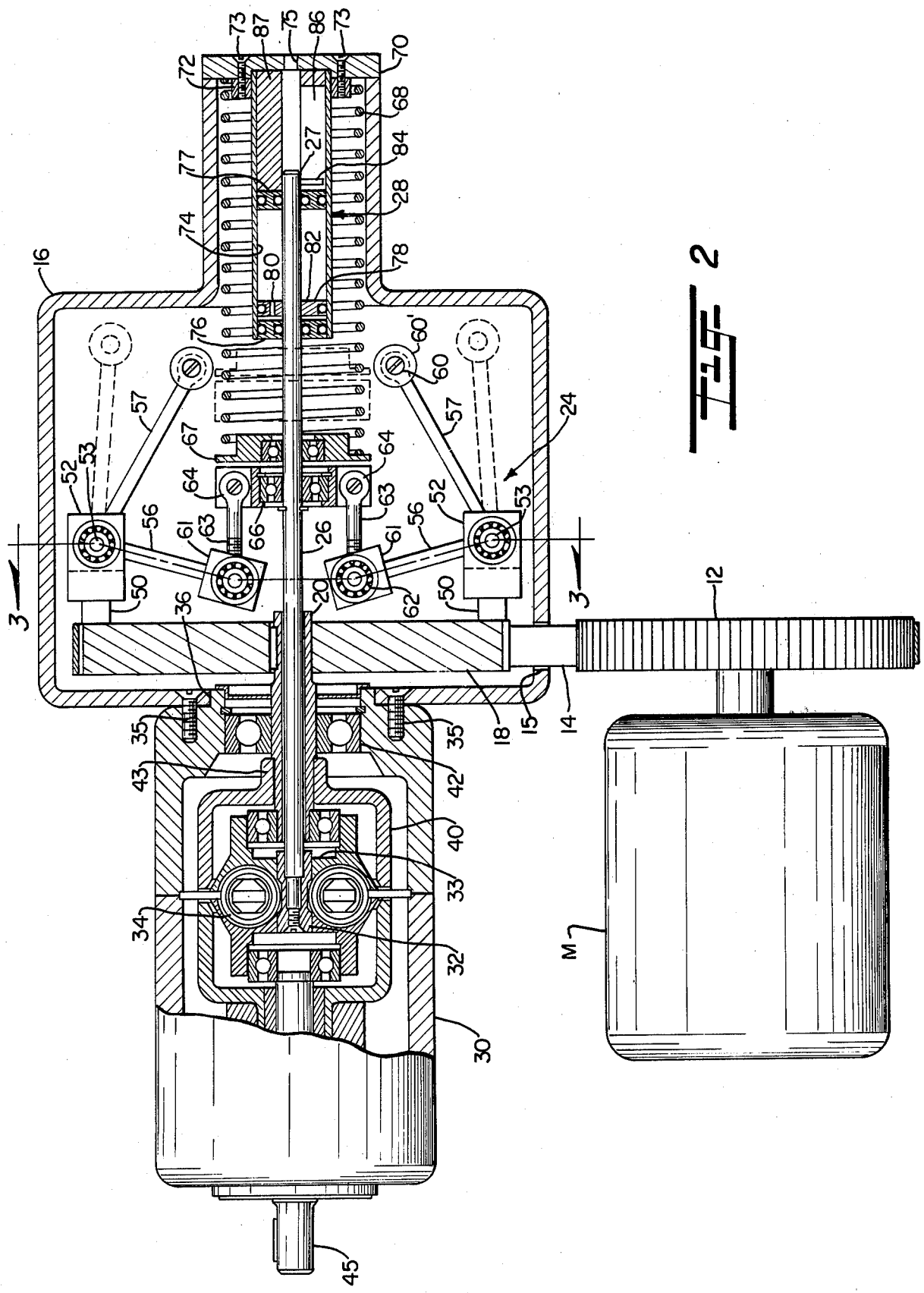

ELECTRIC MOTOR DRIVE WITH INFINITELY VARIABLE SPEED TRANSMISSION

This invention relates to electrical motor drives for vehicles; and more particularly relates to an electrical motor drive coupled to an infinitely variable speed transmission in which the speed ratio is closely controlled to maintain the operating speed of the motor at its most efficient performance level notwithstanding wide variations in the load imposed on the vehicle or vehicle speed.

BACKGROUND AND FIELD OF THE INVENTION

There is an ever-increasing demand for electrical motor drive systems which possess the desirable accelerating and driving characteristics of internal combustion engines coupled with automatic transmissions while avoiding the problems of severe pollution and energy consumption. Electrical motor drives which have been devised for use in motor vehicles require a battery system which is excessively large in order to provide the necessary power and motive force. Even with the utilization of large battery systems, however, the range of such vehicles has been limited and the available horsepower is extremely low when compared with the internal combustion engine. Further, highly complex electrical control circuitry has been employed in the past to correlate the characteristics of the electric motor drive with the operating requirements of the vehicle, primarily due to the comparatively low horsepower capacity of electric motors and the extent to which their operating efficiency is affected by the speed at which they are run. Representative of the approaches heretofore undertaken in the development of electrical motor drives is U.S. Letters Patent to Tabor U.S. Pat. No. 3,858,674 which discloses a flywheel drive for an electric car wherein the flywheel is coupled to a torque converter to vary the speed ratio. U.S. Letters Patent to Locker et al. U.S. Pat. No. 4,065,702 discloses the use of a flywheel to control a variable speed unit for adjustment of the speed of a motor of an electric drive vehicle. Other patents which employ a similar approach are U.S. Pat. No. 3,476,201 to Swaine and U.S. Pat. No. 3,497,026 to Calvert.

It has also been proposed in the past to employ infinitely variable speed drive transmissions in automotive vehicles. For instance, U.S. Pat. No. 3,237,468 to Schottler discloses a ball and race type power transmission which is designed to transmit high torque between a drive and driven shaft through a wide range of speed ratios and employs a speed governor to operate the transmission at the highest possible speed ratio in order to achieve maximum efficiency and performance. Other patents directed to similar types of infinitely variable speed transmissions are U.S. Pat. Nos. 3,071,018 to Floyd; 3,248,960 and 3,745,844 to Schottler; also, 2,727,396 to Haugwitz. These patents however do not address themselves to the problems peculiar to the use of a battery-operated DC motor as a power source for motor vehicles and especially to the problem of avoiding the sophisticated and complex electronic circuitry heretofore required to control a DC motor.

SUMMARY OF THE INVENTION

It is therefore an object of the present invention to provide for a novel and improved variable speed drive system; and further to provide a drive system which is specifically conformable for use in applications having intermittent high torque or inertial load at low speeds.

It is another object of the present invention to provide for a novel and improved electric vehicle of the type employing a DC motor drive with a variable speed drive transmission and means capable of controlling the speed of the motor to operate at its most efficient performance level so as to minimize the power requirements of the motor and to enable the use of a simplified efficient control circuit.

A further object of the present invention is to provide for an electric vehicle in which a variable speed transmission is controlled by a speed responsive flyball governor and resistance compensator in such a way as to maintain the electric motor drive at its most efficient operating level.

In accordance with the present invention, a variable speed drive has been devised for motor vehicles and like applications which are characterized by having an output shaft with maximum torque requirements at lower speeds of operation and relatively low torque requirements at higher speeds of operation. The variable speed drive broadly comprises a DC motor drive with a speed reducer between the motor drive and a flyball governor system which in turn is operatively connected to an infinitely variable speed free ball transmission. The infinitely variable speed transmission includes a movable control member which is shiftable or pivotal to vary the speed ratio between the input and output sides of the transmission over a predetermined range, the pivoting of the control member being regulated by the flyball governor. The governor includes flyweights responsive to changes in the speed of rotation of the electric motor drive to vary the ratio of the output speed and torque delivered with respect to the input speed and torque applied by the power transmission; and a predetermined resistance is imposed on the movement of the flyball governor to control the speed ratio of the infinitely variable speed transmission as the electric motor drive is accelerated with the maximum output speed attainable being matched to the most efficient operating speed level of the electric motor. In the accomplishment of the foregoing, an infinitely variable speed transmission is directly coupled to a battery-powered DC motor in such a way as to maintain the operation of the motor at its most efficient operating level. Specifically, the speed ratio of the transmission is established so that at lower vehicle speed ranges it will minimize the load requirements of the motor by being set at a predetermined step-down ratio; and under acceleration of the motor the speed ratio will be reduced gradually and continuously to a predetermined ratio which will permit the motor to be operated at its most efficient performance level while delivering maximum power through the output shaft. A novel, improved form of flyball governor system is employed to cause the variable speed transmission to undergo a gradual transition in speed ratios in response to increases in motor speed, the movement of the flyball governor being regulated by a dashpot assembly in combination with a regulator spring to impose a predetermined resistance to outward movement of the flyball under increasing centrifugal forces.

The above and other objects, advantages and features of the present invention will become more readily appreciated and understood from the foregoing detailed description of a preferred embodiment when taken together with the accompanying drawings, in which:

BRIEF DESCRIPTION OF THE DRAWINGS

FIG. 2 is a view enlarged and partially in section of the preferred form of electric motor drive.

DETAILED DESCRIPTION OF THE PREFERRED EMBODIMENT

Figure 1:
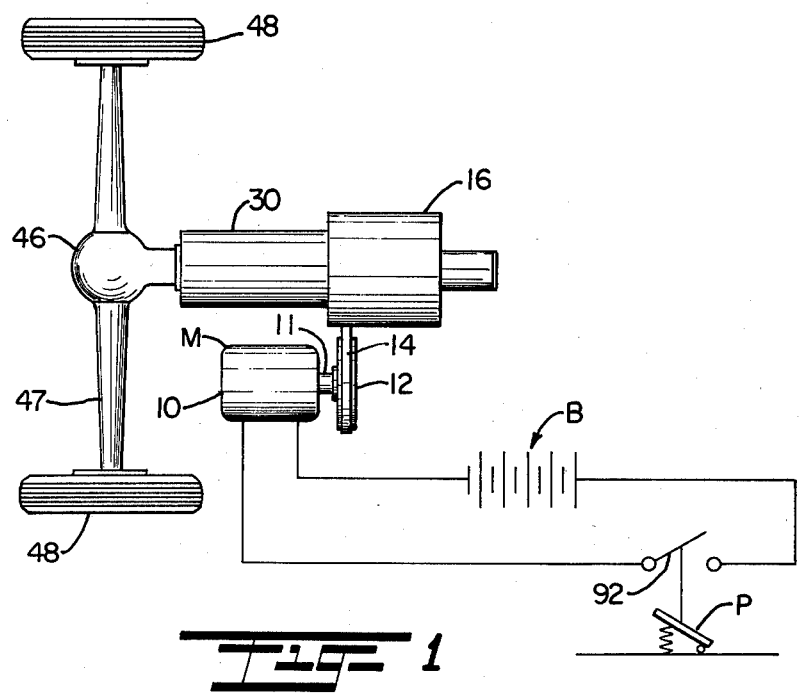
FIG. 1 is a somewhat schematic representation of a preferred form of electric motor drive installed in the drive train of a motor vehicle.

As shown in FIG. 1, a DC motor 10 has an output drive shaft 11 into a power transmission system defined by a belt drive pulley 12 which is preferably of the type adapted for driving a cog belt 14. The cog belt extends through slots 15 formed in housing 16 and, as illustrated in FIG. 3, is trained about a driven pulley 18 which is journaled by means of bushing 20 on an actuator shaft 26.

Figure 3:
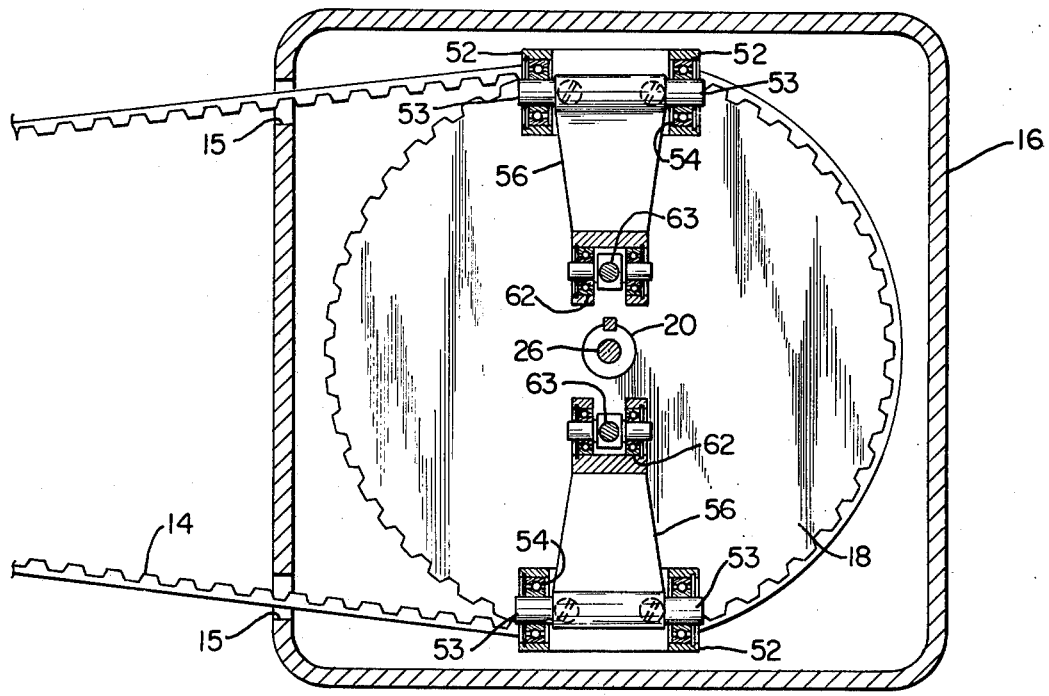
FIG. 3 is a cross-sectional view taken about lines 3—3 of FIG. 2.

As shown in FIG. 3, generally the housing 16 encloses a flyball governor system 24 which is operated off of the driven pulley 18 to control the axial shifting of actuator shaft 26 which runs along the longitudinal axis of the housing 16 and extends into an infinitely variable speed drive transmission generally designated at 30. In a manner to be described, the actuator shaft 26 will undergo axial movement only in response to changes in speed of the pulley 18 which will cause a change in position of the flyball governor so as to shift the actuator shaft 26. The actuator shaft 26 has a slotted end 27 which is movable through a dashpot assembly 28 at one end of the housing 16. In turn, an opposite end has a helical worm 32 which extends through the transmission housing 30 to effect a ratio change in the drive transmission 30 through axially displaceable gearing 33 associated with control gimbals 34. The transmission 30 is mounted by suitable fasteners 35 at one end of the housing 16 to the flyball governor system 24 and is centered coaxially with respect to the end of the housing 16 by a protruding flange 36 which projects into an opening in the end of the housing 16.

Rotational movement of the pulley 18 is imparted through drive bushing 20 which is keyed to the pulley 18 and transmits the rotational motion of the pulley 18 into an outer drive sleeve 40 in the variable speed drive transmission 30. The drive bushing 20 projects rearwardly from the pulley through the inner race of a ball bearing 42 and is coupled through torque sensing cams to the forward reduced end 43 of the sleeve 40. The opposite end of the drive sleeve is drivingly connected to an output shaft 45 which projects through the rearward end of the housing 30 for interconnection with the clutch plate of a standard differential 46 which may for example be mounted on rear axle 47 for driving the wheels 48. As will become readily apparent, the present invention also may be drivingly connected into the front wheels of a motor vehicle.

Referring again to FIGS. 2 and 3, pillow blocks 50 extend axially from the front face of the pulley 18 in diametrically opposed relation to one another and support the rotating flyball governor system 24 through a pair of flanged ball bearings 52 which are mounted on a shaft 53 and secured by snap rings 54. As best seen from FIG. 3, the flyball governor system 24 includes a bell crank consisting of a pair of arms 56 and 57 which extend substantially at 90° to one another from a common connection to the shaft 53. Each arm 57 projects generally in a forward direction and terminates in a free end to which is removably secured a flyweight 60 within a transverse sleeve-like retainer 60'. The other arm 56 extends generally in a radial inward direction from the shaft 53 for connection at its opposite end to a spherical pivot 61 disposed on ball bearing 62 at the threaded rod end 62 of a clevis 64. The clevises 64 are mounted in diametrically opposed relation to one another on a ball bearing assembly 66 adjacent to a second ball bearing assembly 67 which serves as a limit stop at the trailing end of a regulator spring 68, the latter disposed in outer spaced concentric relation to the dashpot assembly 28.

The dashpot assembly 28 is disposed within a protective cover plate 70 with the regulator spring 68 interposed between the dashpot assembly 28 and cover plate 70, and the spring 68 is centered in position by a clamp ring 72 secured by fasteners 73 in the end wall of the cover plate. The dashpot assembly 28 comprises an oil-filled cylinder 74 which is centered in relation to an orifice 75 at the forward end of the cover plate 70, and the actuator shaft 26 extends through fixed, axially spaced sealing rings 76 and 77 which are mounted in sealed relation to the inner wall of the cylinder 74 as shown. The dashpot assembly 28 is so constructed as to establish controlled resistance to the movement of the actuator shaft 26 as the automobile is accelerated by regulating the amount of oil in the cylinder which is permitted to bypass a movable piston head 78. The piston head 78 is keyed on the shaft between the sealed ends 76 and 77, and a bypass orifice 80 in the piston head 78 is dimensioned to establish controlled leakage of the oil between opposite sides of the piston head 78. In addition, a check valve 82 may be mounted in the piston head 78 to permit more rapid passage or leakage of oil through the check valve when the motor is decelerated, but the valve 82 is capable of closing in the opposite direction of movement to restrict passage of oil through the bypass orifice 80.

In order to regulate the drive ratio between the leading, helical end 32 of the actuator shaft 26 and the axially displaceable gearing 33, a pin 84 projects laterally from the actuator shaft 26 and is aligned with an axially extending groove 86 in the inner wall of the cylinder 74. The groove 86 is formed in the body of a separate sleeve 87 which is releasably fixed within the cylinder by the fasteners 73 and clamp plate 72. By loosening the clamp plate 72, it is possible to turn the shaft 26 and sleeve 87 by inserting a screwdriver through the orifice 75 into engagement with the slotted end 27 so as to rotationally adjust the helical end 32 with respect to the gearing 33 for a desired speed ratio range. As a practical matter, this drive ratio is established with a maximum stepdown ratio of 5-to-1 at lower speeds and 1-to-1½ step-up ratio as the car reaches its maximum speed. In other words, the ratio between the input and the output side of the drive transmission may be established so that at lower speeds, for five turns of the driven pulley 18, the output shaft 45 will rotate one turn; and at higher speeds, for a single turn of the pulley, the output shaft 45 of the drive transmission will rotate 1½ times.

The regulator spring 68 is a compression spring having a predetermined spring force to counterbalance the centrifugal force of the flyweights and specifically to impart a predetermined resistance to movement of the shaft 26 through the dashpot assembly in response to increasing speeds of rotation of DC motor. Thus, at extremely low speeds, the spring force of the regulator spring 68 is such that it will bias the variable speed transmission speed ratio to its maximum ratio setting, and the precompression of the spring 68 is set so that it will overcome any tendency of the flyweight system to vary the speed ratio at low motor speeds and maintain that maximum setting. However, as the centrifugal force of the flyweights increases, they will impart a reaction force to the control shaft 26 which will gradually overcome the spring 68 and cause the actuator shaft 26 to be advanced axially through the dashpot assembly. The rate of shifting and variation in the speed ratio of the transmission 30 is regulated by controlling the outward pivotal movement of the weights under increasing centrifugal force by the sizing of orifice 80 of the dashpot assembly.

In the preferred form, a compound wound DC motor is employed, such as, a model EO-23094 7 ¼" diameter motor of the type manufactured by Presto Lite Electrical Division of Toledo, Ohio. As schematically illustrated in FIG. 1, the DC motor 10 is provided with a power source which takes the form of a bank of series-connected batteries B, and an on-off switch 92 which is closed, for example, by depression of an accelerator pedal P. When the switch is turned on, and the motor is energized a maximum ratio is established in the variable speed transmission to minimize the loading and allow the motor to quickly come up to speed. Thereafter, the vehicle will gradually build up to a condition of maximum speed while maintaining the motor operating speed at the maximum power value.

The drive transmission illustrated in FIGS. 1 and 3 is preferably an infinitely variable speed, free ball transmission of the type having pivotal steering control rollers in which the speed ratio can be varied over a wide range between the actuator shaft 26 and output shaft 45. Thus, a free ball traction drive of the type shown having an available torque or speed ratio between 10:1 and 1:1 is particularly suitable in that it is compact, requires very low power to change ratios, is highly sensitive and through the control system as described is closely responsive to motor speed changes. One commercially available drive, as shown in the drawings, is the Contraves drive made and sold by TEK Products Corporation of High Point, North Carolina. Generally, the drive is modified by utilizing the helical end or worm 32 which operates on the gear teeth on the races 33 of the control gimbals 34 to shift the axes of rotation of the gimbals with respect to spherical ball drives, not shown, and thus to vary the speed ratio of the output shaft 45 from the outer housing 10.

Another variable speed transmission which can be employed may be of the type disclosed in U.S. Patent to Haugwitz, U.S. Pat. No. 2,727,396. It will be apparent that still other forms of variable speed transmissions may be substituted which are capable of responding to the low energy movement of the control shaft to vary the speed ratio into an output shaft.

For the purpose of illustration, the DC motor employed may have a maximum output speed of 4000 rpm which is controlled by a bank of sixteen 6-volt batteries. The compound, series-wound motor drive has a 24-tooth timing belt pulley 12 on its output shaft 11 which drives a 48-tooth timing belt pulley 18 on the actuator shaft 20 into the variable speed transmission 30. Speed shifting can take place rapidly with a speed ratio of 5-to-1 from the input to the output side of the drive. The flyweights are set so as to be capable of overcoming the compression force of the spring at a speed of approximately 1200 rpm. These flyweights may be initially positioned or set by threaded adjustment of the rod ends 63 in the spherical pivots 61 through the arms 56 which extend inwardly from the pillow blocks 52.

Now considering the balancing effect of the flyball governor and its resistance compensator arrangement as defined by the spring 68 and dashpot 28, resistance compensation is accomplished initially by the action of the regulator spring 68 which when the motor is at zero speed will urge the flyball governor and the actuator shaft 26 to a position establishing a maximum speed or torque ratio, such as, on the order of 5:1. As the motor starts to accelerate, the tendency of the flyweights to rotate outwardly under centrifugal force is counterbalanced both by the regulator spring 68 and the dashpot assembly 28 so as to impose a predetermined amount of resistance to movement of the flyweights and assure that a smooth rate of change of torque or speed ratio is maintained and principally with the objective of permitting the motor to quickly accelerate up to its optimum rated performance level in the shortest possible time. The dashpot assembly aids in imposing a predetermined resistance to outward movement of the flyweights by establishing the controlled leakage of oil past the piston head 78 as the drive motor accelerates the flyball governor system. In other words, the motor will accelerate much more rapidly to its optimum rated performance level than the actual ground speed of the car so that the motor will reach its desired performance level as the car is more gradually increasing in ground speed in response to the more gradual change in speed ratio in the transmission 30. Once the transmission reaches a speed ratio on the order of 1:1 or greater, the car will be capable of running at its maximum speed. In climbing a hill, causing a reduction in ground speed, the resistance compensator system will automatically adjust the transmission ratio for the reduction in speed and increased load which will cause reduced speed of rotation of the flyweight so as to permit the spring force to overcome the flyweights and to rapidly increase the speed ratio thereby permitting the motor to continue to operate at its optimum speed while increasing the step-down ratio through the transmission.

From the foregoing, it will be appreciated that the resistance compensator will impose a predetermined resistance to the movement of the flyball governor to regulate the speed ratio of the transmission 30 notwithstanding variations in the loads imposed at the output side of the transmission. Thus, the motor drive is capable of rapidly accelerating and the resistance compensator arrangement is closely regulating the speed ratio of the transmission and to match it with the most efficient operating speed of the electric motor drive.

Although the present invention has been described with particularity relative to the foregoing detailed description of the preferred embodiment, various modifications, changes, additions and applications other than those specifically mentioned herein will be readily apparent to those having normal skill in the art without departing from the spirit and scope of this invention.

I claim:

1. A variable speed drive for motor vehicles and the like characterized by having an output shaft with high torque requirements at low speeds of operation, the combination comprising:

an electric motor drive;

infinitely variable speed transmission means having an input driven by said motor drive and an output coupled to a vehicle to be driven, said infinitely variable speed transmission means including a movable control member shiftable to vary the speed ratio between the input and output of said transmission means over a predetermined range of speed ratios;

speed ratio control means operatively coupled to said movable control member, said control means movable in response to rotation of said motor drive to vary the ratio of the output speed and torque at the output side of said transmission with respect to the input speed and torque; and resistance compensator means for imposing a predetermined resistance to movement of said control means whereby to control the speed ratio between the input side and the output side of said infinitely variable speed transmission, the maximum output speed of said transmission means being matched to the most efficient operating speed of said electric motor drive.

2. A variable speed drive according to claim 1 wherein said electric motor drive is a DC compound, series-wound motor.

3. A variable speed drive according to claim 2, said compound, series-wound DC motor having a power source limiting operation of said motor to its optimum performance level.

4. A variable speed drive according to claim 1, including a power source, an on-off switch and means for opening and closing said on-off switch.

5. A variable speed drive according to claim 1, said resistance compensator means normally biasing said infinitely variable speed transmission to its maximum step-down speed ratio.

6. A variable speed drive according to claim 5, said control means including centrifugal flyweights rotatable in response to energization of said motor drive, said resistance compensator means including a regulator spring operative to impart a predetermined resistance force to outward radial movement of said flyweights.

7. A variable speed drive according to claim 6, said movable control member defined by an actuator shaft axially movable in response to outward radial movement of said flyweights, and the speed ratio of said infinitely variable speed transmission being regulated by axial movement of said actuator shaft.

8. A variable speed drive according to claim 7, said resistance compensator means including a dashpot chamber to impose a predetermined resistance to axial movement of said actuator shaft in response to outward radial movement of said flyweights.

9. A variable speed drive according to claim 8, said dashpot chamber including means to adjust the speed ratio of said infinitely variable speed transmission independently of said control means.

10. A variable speed drive according to claim 1, the speed ratio of said infinitely variable speed transmission being progressively reduced in response to increasing speeds of rotation of said control means until it reaches a minimum predetermined ratio which is matched to the most efficient speed level of said motor drive.

11. A variable speed drive for high inertial loads characterized by having an output shaft with high torque requirements at low speeds of operation and relatively low torque requirements at high speeds of operation, the combination comprising:

a DC motor drive including a control circuit and a plurality of batteries connected in series;

power transmission means drivingly connected to said motor drive;

infinitely variable speed transmission means having an input member driven by said power transmission means and an output member coupled to a load to be driven, said infinitely variable speed transmission means including a movable control member shiftable to vary the speed ratio between the input and output members of said infinitely variable speed transmission means over a predetermined range;

flyball governor means operatively coupled to the input member of said infinitely variable speed transmission means, said flyball governor means including flyweights movable radially outwardly in response to increasing speeds of rotation of said power transmission means to vary the ratio of the output speed and torque at the output side of said infinitely variable speed transmission means with respect to the input speed and torque from said power transmission means; and regulator means for imposing a predetermined resistance to outward radial movement of said flyweights whereby to control the acceleration and speed at the output side of said infinitely variable speed transmission for a given acceleration and speed of said motor drive.

12. A variable speed drive according to claim 11 wherein said electric motor drive includes a DC compound, series-wound motor, said motor drive having a power source limiting operation of said motor to its optimum performance level.

13. A variable speed drive according to claim 12, said control circuit including a plurality of series-controlled batteries.

14. A variable speed drive according to claim 11, said regulator means normally biasing said infinitely variable speed transmission to its maximum step-down speed ratio.

15. A variable speed drive according to claim 14, said regulator means defined by a regulator spring and a dashpot chamber to impose a predetermined resistance to axial movement of said movable control member in response to outward radial movement of said flyweights.

16. A variable speed drive according to claim 15, said movable control member being axially movable in response to outward radial movement of said flyweights, and the speed ratio of said infinitely variable speed transmission means being regulated by axial movement of said movable control member.

17. A variable speed drive according to claim 16, said dashpot chamber including means to adjust the speed ratio of said infinitely variable speed transmission independently of said flyball governor.

18. A variable speed drive according to claim 11, the speed ratio of said infinitely variable speed transmission means being progressively reduced by said regulator means in response to increasing speeds of rotation of said flyball governor means until it reaches a minimum predetermined ratio which is matched to the most efficient speed level of said DC motor drive.

* * * * *